(12) United States Patent
Shumate et al.

(10) Patent No.: US 10,794,528 B2
(45) Date of Patent: Oct. 6, 2020

(54) INSULATION PRODUCT WITH INWARD CURLING CLOSURE FLAP

(71) Applicant: JOHNS MANVILLE, Denver, CO (US)

(72) Inventors: Monroe William Shumate, Scottsdale, AZ (US); Derek Cooper Bristol, Littleton, CO (US)

(73) Assignee: Johns Manville, Denver, CO (US)

( * ) Notice: Subject to any disclaimer, the term of this patent is extended or adjusted under 35 U.S.C. 154(b) by 551 days.

(21) Appl. No.: 15/436,490

(22) Filed: Feb. 17, 2017

(65) Prior Publication Data

US 2017/0175945 A1  Jun. 22, 2017

Related U.S. Application Data

(63) Continuation of application No. 12/855,833, filed on Aug. 13, 2010, now abandoned.

(51) Int. Cl.
*F16L 59/02* (2006.01)
*F16L 59/14* (2006.01)
(Continued)

(52) U.S. Cl.
CPC .............. *F16L 59/029* (2013.01); *B32B 1/08* (2013.01); *B32B 3/266* (2013.01); *B32B 5/028* (2013.01); *B32B 5/18* (2013.01); *B32B 7/06* (2013.01); *B32B 7/12* (2013.01); *B32B 15/046* (2013.01); *B32B 15/12* (2013.01); *B32B 15/14* (2013.01); *B32B 27/065* (2013.01); *B32B 27/10* (2013.01); *B32B 27/12* (2013.01); *B32B 29/02* (2013.01); *B32B 37/10* (2013.01); *B32B 37/12* (2013.01); *B32B 38/1866* (2013.01); *F16L 59/026* (2013.01); *F16L 59/14* (2013.01); *F24F 13/0263* (2013.01); *B32B 37/144* (2013.01); *B32B 38/1875* (2013.01); *B32B 2250/05* (2013.01); *B32B 2255/02* (2013.01); *B32B 2255/06* (2013.01); *B32B 2255/10* (2013.01); *B32B 2255/12* (2013.01); *B32B 2255/205* (2013.01); *B32B 2305/022* (2013.01); *B32B 2305/026* (2013.01); *B32B 2305/08* (2013.01);
(Continued)

(58) Field of Classification Search
CPC .............................. F16L 59/023; F16L 59/022
See application file for complete search history.

(56) References Cited

U.S. PATENT DOCUMENTS

3,012,923 A * 12/1961 Slayter .................... B29C 53/24
156/62.2
3,442,750 A  5/1969 Wilcox
(Continued)

*Primary Examiner* — Jeffry H Aftergut
(74) *Attorney, Agent, or Firm* — Robert D. Touslee (57) ABSTRACT

A pipe insulation product including a core of insulating material and a laminate surrounding the core and bonded to the core. The core may include an outer surface; an inner surface; and a wall extending between the outer and inner surfaces. The laminate may include a foil or metallized polymeric film sheet, a scrim, a porous media sheet, and a polymeric film sheet bonded together via an adhesive. The laminate may include a closure flap that is configured to adhesively seal opposite ends of the laminate together to form a cylindrical tube with the core enclosed therein. The closure flap may be configured to include a curl that provides a greater closure flap adhesive seal.

25 Claims, 4 Drawing Sheets

(51) Int. Cl.
  *B32B 1/08* (2006.01)
  *B32B 5/02* (2006.01)
  *B32B 37/12* (2006.01)
  *F24F 13/02* (2006.01)
  *B32B 38/18* (2006.01)
  *B32B 15/14* (2006.01)
  *B32B 3/26* (2006.01)
  *B32B 7/06* (2019.01)
  *B32B 27/10* (2006.01)
  *B32B 5/18* (2006.01)
  *B32B 7/12* (2006.01)
  *B32B 15/04* (2006.01)
  *B32B 15/12* (2006.01)
  *B32B 27/06* (2006.01)
  *B32B 27/12* (2006.01)
  *B32B 29/02* (2006.01)
  *B32B 37/10* (2006.01)
  *B32B 37/14* (2006.01)
  *B32B 38/00* (2006.01)

(52) U.S. Cl.
  CPC ..... *B32B 2305/38* (2013.01); *B32B 2307/304* (2013.01); *B32B 2307/7246* (2013.01); *B32B 2307/736* (2013.01); *B32B 2317/122* (2013.01); *B32B 2597/00* (2013.01); *Y10T 29/49826* (2015.01)

(56) References Cited

U.S. PATENT DOCUMENTS

| | | |
|---|---|---|
| 3,658,614 A | 4/1972 | Beck |
| 4,054,710 A | 10/1977 | Botsolas |
| 4,780,347 A | 10/1988 | Cohen |
| 4,980,205 A | 12/1990 | Haskell |
| 5,516,580 A | 5/1996 | Frenette et al. |
| 5,776,841 A | 7/1998 | Bondoc et al. |
| 5,830,548 A * | 11/1998 | Andersen ............ B28B 1/00 428/36.4 |
| 7,159,620 B2 | 1/2007 | Kissell |
| 2004/0137181 A1 | 7/2004 | Ruid et al. |

\* cited by examiner

INSULATION PRODUCT WITH INWARD CURLING CLOSURE FLAP

CROSS-REFERENCES TO RELATED APPLICATIONS

This application is a continuation of Non-Provisional U.S. patent application Ser. No. 12/855,833 filed Aug. 13, 2010. This application is related to Applicant's U.S. Pat. No. 9,376,814 issued Jun. 28, 2016 entitled "Systems and Methods for Insulating a Pipe"; Applicant's U.S. Pat. No. 8,104,519 issued Jan. 31, 2012 entitled "Pipe Insulation Product with Charge Dissipater"; and, Applicant's U.S. Pat. No. 8,141,594 issued Mar. 27, 2012 entitled "Pipe Insulation Products and Methods".

The entire disclosures of the aforementioned Non-Provisional U.S. Patent Application and U.S. Patents are hereby incorporated by reference, for all purposes, as if fully set forth herein.

BACKGROUND OF THE INVENTION

The subject invention relates generally to pipe insulation products and more specifically to pipe insulation products comprising an insulating material core enclosed within a laminate jacket.

Piping is often used to transport one or more fluids between destinations. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

During fluid transportation, the fluid may be subjected to heating and/or cooling from the surrounding environment. For example, the fluid may be transported in either a hot or cold state relative to the surrounding environment, which induces heat transfer to or from the fluid and pipes. HVAC systems are a common example of systems that routinely utilize various pipe configurations to transport hot or cold fluids. Due to the conductive nature of the pipes (especially metal pipes), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

To reduce heat transfer during fluid transportation, pipe insulation products are commonly installed on one or more sections of pipes to retard the flow of heat to or from the pipes. Commonly, one or more sections of pipe are fitted with a pipe insulation product where the sections of pipe are generally fully encased within the pipe insulation product. Separate sections of the pipe insulation product are often coupled together via adhesive tapes. The outer surface of the pipe insulation product is often designed to enhance the visual appeal of the piping system and serve as a means for sealing the pipe insulation product about the pipes of the piping system. In addition, the various layers of the pipe insulation product often serve one or more important functions (e.g., restricting water vapor transmission; resisting mold, mild, and/or fungal growth; providing puncture resistance, tensile strength, and/or durability; resisting UV, handling, environmental, and/or shipping damage, etc.).

To perform some of these functions, it is critical that the outer layer of the pipe insulation product be sealed and remain sealed over the life of the pipe insulation product. For example, the pipe insulation product may include one or more layers that restrict the transmission of water vapor or other environmental contaminants through the laminate. Generally, a pipe insulation product is required to have a water vapor transmission rate of no greater than 0.02 perms. If the pipe insulation product is not able to seal and/or remain sealed over the life of the product, the layer that functions as a water vapor barrier or retarder may be compromised or circumvented because water vapor and/or other contaminants may freely flow through the unsealed portion of the pipe insulation product.

Leakage of water vapor and/or other contaminants into the pipe insulation product's interior may cause a variety of problems for the insulated pipe and/or surrounding objects including: condensation of water on the pipes; mold, mildew, or fungal growth; pipe corrosion or degradation; staining of the pipe insulation product and/or surrounding objects; water drip damage; loss of the pipe insulation product's insulating value, etc. Hence, the integrity of the pipe insulation product's seal is critically important to the functionality of the pipe insulation product.

BRIEF SUMMARY OF THE INVENTION

One embodiment of the present invention may include a pipe insulation product for insulating a pipe. The pipe insulation product may include a tubular core of insulating material and a laminate that is roughly rectangular in shape, that is and bonded to the tubular core, and that is flexible so that the tubular core and laminate can be opened, placed about a pipe, and closed without degrading the laminate.

The tubular core may include a length and a longitudinal axis; a substantially cylindrical outer surface; a substantially cylindrical inner surface; and a wall extending between the cylindrical outer surface and the cylindrical inner surface. The wall may include a radially extending thickness and a slit that extends completely through the wall from the outer surface to the inner surface and that extends parallel to the longitudinal axis of the tubular core for the length of the tubular core.

The laminate may include a polymeric film sheet that forms an outer exposed layer of the laminate; a foil or metallized polymeric sheet material that provides a fluid vapor barrier to minimize fluid vapor transmission through the laminate; a scrim comprising a mesh of a plurality of fibers; a porous media sheet; and an adhesive that bonds the foil or metallized polymeric sheet material, the scrim, the porous media sheet, and the polymeric film sheet together to form the roughly rectangular laminate.

The laminate may also include a closure flap that is configured to adhesively seal opposite sides of the laminate in a closed position so that the laminate forms a substantially cylindrical tube with at least a portion of the tubular core enclosed therein. The closure flap may be configured to include a curl that provides a greater closure flap adhesive seal bond. The porous media sheet may include a kraft paper between the range of 25 and 35 pounds per 3000 square feet to provide a greater closure flap adhesive seal bond by increasing the flexibility of the laminate.

Configuring the closure flap to include a curl may comprise either reducing an amount of curl already present in the closure flap, where the present curl is a curling of the closure flap away from the closed position (i.e., reverse curl); or may include configuring the closure flap to curl toward the closed position. Configuring the closure flap to include a curl may also comprise controlling an amount of tension in the polymeric sheet material and an amount of tension in one or more of the other layers during lamination of the layers so that, after lamination, the tension in the polymeric sheet material is less than the tension in the one or more of the other layers. Configuring the closure flap to include a curl may further comprise securing the closure flap in the closed position, heat treating the laminate to soften the polymeric sheet material, and cooling the polymeric sheet material so that the polymeric sheet material hardens with the closure flap curled toward the closed position.

Configuring the closure flap to include a curl may additionally comprise arranging at least one laminate so that the closure flap is positioned in the closed position and maintaining or holding the laminate with the closure flap in the closed position for a period of time so that, after the period of time, shape memory is induced in the closure flap. Configuring the closure flap to include a curl may additionally comprise positioning the scrim between the porous media material and the polymeric sheet material to either provide improved control over the tensioning of one or more of the polymeric sheet material, the porous medial material, and the foil or metallized polymeric sheet material; or to provide increased stability to the polymeric sheet material.

Configuring the closure flap to include a curl may additionally comprise either controlling the temperature of an adhesive used to bond the laminate and tubular core to minimize heat dissipation from the adhesive to the polymeric sheet material; or cooling the tubular core of insulating material to roughly ambient temperature prior to bonding the tubular core and the laminate to minimize heat dissipation from the insulating material to the polymeric sheet material. Configuring the closure flap to include a curl may additionally comprise either controlling the size and configuration of the fibers of the scrim fiber mesh to reduce a curl of the closure flap away from the closed position; or configuring the scrim fiber mesh to include one or more fibers configured to provide the closure flap with a positive curling force toward the closed position.

Another embodiment of the present invention may include a method for producing a roughly rectangular laminate that provides a greater laminate seal. The method may include providing a foil or metallized polymeric sheet material that forms an inner layer of the laminate and that provides a fluid vapor barrier to minimize fluid vapor transmission through the laminate. The method may also include providing a polymeric sheet material that is coextensive with the foil or metallized polymeric sheet material and that forms an outer exposed layer of the laminate. The method may further include providing a scrim comprising a mesh of a plurality of fibers where the scrim is coextensive with the foil or metallized polymeric sheet material. The method may additionally include providing a porous media sheet material.

The porous media sheet material may be coextensive with the foil or metallized polymeric film sheet. The scrim and porous media sheet material may be positioned between the foil or metallized polymeric film sheet and the polymeric film sheet. The method may additionally include bonding the foil or metallized polymeric sheet material, the scrim, the porous media sheet material, and the polymeric sheet material together with an adhesive to form the laminate jacket. The laminate jacket may include a closure flap that is configured to adhesively seal opposite sides of the laminate jacket in a closed position so that the laminate jacket forms a hollow cylindrical tube. The method may additionally include configuring the closure flap to include a curl that provides a greater closure flap adhesive seal bond.

The method for producing a laminate jacket may additionally include bonding a tubular core of insulating material with the laminate jacket. The method for bonding the tubular core and laminate jacket may include positioning a tubular core of insulating material directly adjacent to the foil or metallized polymeric sheet material. The method may also include bonding the tubular core of insulating material with the foil or metallized polymeric sheet material with an adhesive material. The laminate and tubular core may be flexible so that the tubular core and laminate jacket can be opened, placed about a pipe, and closed without degrading the laminate jacket. The method may further include flexing the tubular core and laminate jacket to open the laminate jacket and tubular core; placing the laminate jacket and tubular core about the pipe; and closing the laminate jacket and tubular core about the pipe by applying pressure to the closure flap to adhesively seal the opposite sides of the laminate jacket.

Another embodiment of the present invention may include a roughly rectangular laminate. The laminate may include a polymeric film sheet forming an outer exposed layer of the laminate; a foil or metallized polymeric sheet material the provides a fluid vapor barrier to minimize fluid vapor transmission through the laminate; a scrim comprising a mesh of a plurality of fibers; a porous media sheet; and an adhesive that bonds the foil or metallized polymeric sheet material, the scrim, the porous media sheet, and the polymeric film sheet together to form the roughly rectangular laminate. The laminate may include a closure flap that is configured to adhesively seal opposite sides of the laminate in a closed position so that the laminate forms a substantially cylindrical tube. The closure flap may be configured to curl toward the closed position to provide a greater closure flap adhesive seal bond.

The foil or metallized polymeric film sheet may form an inner layer of the laminate and the porous media sheet may be positioned immediately adjacent to the foil or metallized polymeric film sheet so that the foil or metallized polymeric film sheet lies substantially flat against the porous media sheet. The configuration of the substantially flat foil or metallized polymeric film sheet may provide an improved perm rating for the laminate.

DETAILED DESCRIPTION OF THE INVENTION

The present invention includes a pipe insulation product that may be used to insulate a pipe and to provide one or more other beneficial properties. For example, the pipe insulation product may serve an aesthetic purpose when fitted about pipe sections. Pipe insulation products are often designed to provide a smooth, finished, and visually appealing outer surface to enhance the visual appeal of the piping systems. In addition, the pipe insulation product may also shield or protect the pipe from one or more environmental elements (e.g., water vapor). The protection/shielding function minimizes potential risks for the pipe and/or for surrounding objects (e.g., minimizes condensation of water on the pipes; mold, mildew, and/or fungal growth; water drip damage; loss of the pipe insulation product's insulating value; etc.). To minimize these risks, it is critical that the outer layer of the pipe insulation product be sealed and remain sealed over the life of the pipe insulation product. Further, the pipe insulation product must readily adapt to a wide variety of different climates and conditions in which the products are often used and/or installed (e.g., hot, cold, humid, dry, etc.).

Pipe insulation products typically include a tubular core of insulating material surrounded by and encased within a laminate jacket or laminate. Individual segments of the pipe insulation product typically range in length from about 36 inches to about 48 inches; have a wall thickness ranging from about 0.5 inches to about 3 inches; and a range in outside diameter from about 2 inches to about 32 inches.

In addition, the laminate may include one or more layers that provide various beneficial properties that enhance the performance of the pipe insulation product. For example, one of the most important functions that the laminate serves is to act as a water vapor barrier to protect the pipe and/or insulating material from water vapor in the surrounding environment. Water vapor that is able to pass into the laminate's interior may condensate on the pipes and/or absorb into the insulating material, which may cause pipe corrosion or degradation; mold, mildew, and/or fungal growth; water drip damage; staining of the laminate and/or surrounding objects; loss of the pipe insulation product's insulating value; etc.

To provide the water vapor barrier function, laminates typically include an aluminum foil layer that reduces the transmission of water vapor and/or other contaminants through the laminate. In addition, laminates typically include a closure flap and adhesive material that allows the ends or edges of the laminate to be sealed in a closed position so that the laminate forms a sealed hollow tube fully encasing the pipe and insulating material (the unsealed laminate allows the laminate and tubular core to be opened and placed about a pipe). The failure of the closure flap to seal and/or remain sealed may compromise or circumvent the laminate's water/contaminant barrier function because water vapor and/or other contaminants may freely flow through the unsealed portion of the laminate into the interior.

In some instance, the configuration of the pipe insulation product may contribute to the inability of the closure flap to seal and/or remain sealed. For example, some laminate jackets include a polymeric film material outer layer. The polymeric film material may be selected as the outer layer to provide one or more advantages including: durability, wrinkle resistance, stain resistance, mold resistance, aesthetic appeal, etc. However, the closure flap of laminates that include a polymeric film outer layer may have a tendency to curl away from the sealing position, or in other words "reverse curl" (i.e., the closure flap may curl away from the position it occupies when the laminate is closed or sealed). The reverse curl of the closure flap may impart a lifting force on the adhesive material that seals the laminate, which may facilitate in failure of the seal. In addition, the inclusion of the polymeric film material outer layer may increase the stiffness and rigidity of the laminate, which may impede the ability of the closure flap to be curled toward the sealing position and remain in the sealing position. Further, the various different climates and conditions that the pipe insulation product may be subjected to, and therefore must adapt to, may increase the likelihood that the closure flap's seal will fail.

The present invention provides a laminate with closure flap having a reduced "reverse curl," or in some embodiments provides a laminate with a closure flap having a "positive curl" where the closure flap curls toward the sealing position (i.e., the closure flap may curl toward the position it occupies when the laminate is closed or sealed). A laminate with a reduced reverse curl or a positive curl may increase the integrity of the closure flap seal (i.e., may provide for a greater closure flap adhesive seal bond) by reducing a lifting force and/or imparting a closure force (i.e., a force biasing the closure flap toward the closed position). Additionally, the reduced reverse curl and/or positive curl may increase the integrity of the seal, and hence reduce the seal's failure rate, over a wide variety of different climates and conditions to which the pipe insulation product may be exposed. In other words, the present invention may allow a single pipe insulation product to be used in a variety of conditions because of the product's increased ability to maintain a closed sealed position in all conditions. These and other advantages of the present invention will become more evident with reference to the figures.

Figure 1:
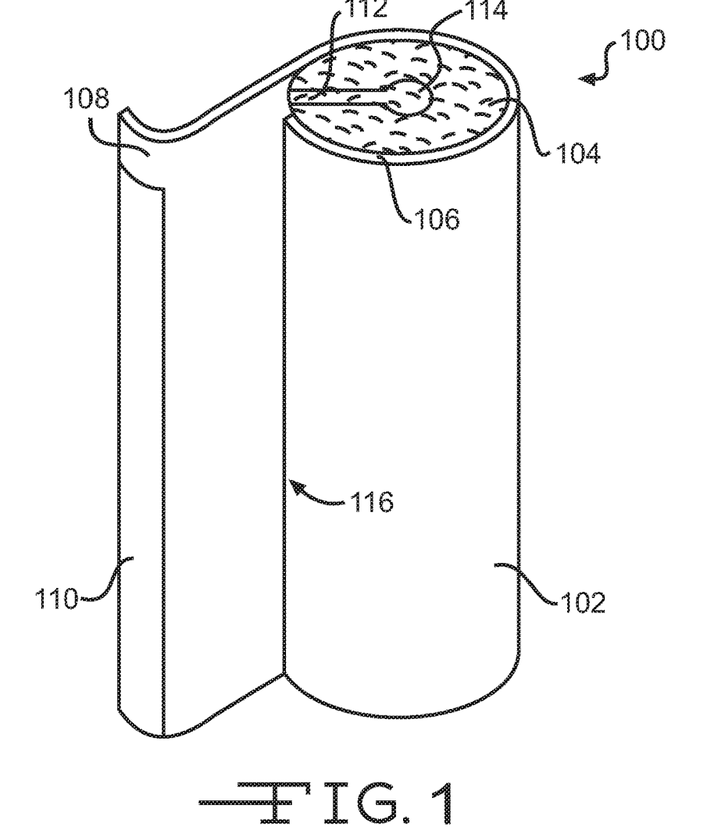
FIG. 1 is a schematic perspective view of a pipe insulation product that includes a core of insulating material encased within a laminate jacket.

As shown in FIG. 1, a pipe insulation product 100 may include a tubular core of insulating material 104 that may include a substantially cylindrical outer surface (i.e., the outside of the tubular core that directly contacts the laminate) and a substantially cylindrical inner surface 114. Extending between the cylindrical outer surface and the cylindrical inner surface 114 may be a wall of insulating material. The insulating material provides the insulating properties of the pipe insulation product 100. In one embodiment, the insulating material may be a fibrous material (e.g., fiberglass, mineral wool, refractory ceramic fiber, chopped strand fiber glass, etc.). In other embodiments the insulating material may be a foam (e.g., phenolic foam, polyisocyanurate, polyolefin, polystyrene, polyurethane), a polymer, foam glass, microporous insulation (e.g., Microtherm®), or any other material that provides insulation.

The cylindrical inner surface 114 may be configured to correspond with a specific pipe outer diameter (e.g., ½ inch, 1 inch, etc.). The tubular core 104 may also include a longitudinally extending slit 112 that passes completely through the wall of insulating material on one side and into the interior of the substantially cylindrical inner surface 114 so that the tubular core 104, and thus, the pipe insulation product 100, can be opened, passed over, and closed about a pipe.

Circumferentially surrounding and encasing the tubular core 104 is a laminate jacket or simply a laminate 102. The laminate 102 has a thickness 106 that includes one or more layers of various materials as described below. The laminate 102 is roughly coextensive with the tubular core 104 and bonded to the cylindrical outer surface. The laminate 102 may be positioned so that a longitudinal edge portion 116 extends parallel and adjacent to the slit 112, but does not overlap the slit 112. The laminate 102 includes a closure flap 108 that may have a pressure sensitive adhesive layer 110 so that the laminate 102 may be adhesively sealed in a closed position fully encasing the tubular core 104 within the laminate 102. The laminate may be sealed by folding or overlapping the closure flap 108 over the longitudinal edge portion 116 of the laminate 102 and by applying pressure to the pressure sensitive adhesive layer 110 so that the closure flap 108 adhesively seals to the outer surface of the overlapped portion of the laminate 102.

In some embodiments, the closure flap 108 may curl outward, meaning that the closure flap 108 curls away from the closed position (FIG. 1 shows the outward or "reverse" curl of the closure flap 108). In such embodiments, the outward or reverse curl must be overcome in order to adhesively seal the closure flap 108 to the laminate's outer surface. The reverse curl of the closure flap 108 may impart a lifting force on the adhesive material after the closure flap 108 is sealed, which may cause the closure flap 108 to become unsealed at some time during the laminate's 102 lifetime (i.e., the reverse curl may cause the closure flap 108 to peel back away from the sealed position). The closure flap's tendency to unseal or peel back may be enhanced under some environmental conditions and/or may be enhanced as those conditions change (i.e., unsealing or peeling back may be accelerated due to high heat and humidity, due to repeated change from high to low temperatures, etc.). The reverse curl may be due to the stiffness of the porous media layer; stiffness, shrinkage, and/or internal stress within the polymeric film sheet layer; etc.

In other embodiments, the closure flap 108 may not have a reverse curl, but may be biased toward a straight or flat position due to the stiffness of the laminate and/or one or more layers of the laminate (i.e., the porous media layer, the polymeric film material, etc.). As additional layers are added to the laminate, the stiffness may increase, which may cause and/or enhance the closure flap 108 sealing problems discussed herein.

The closure flap 108 may include a removable silicone treated release strip (not shown) removably adhered to the pressure sensitive adhesive layer 110 to protect the adhesive material from degradation prior to installation. Maintaining a sealed closed position is a critical function of the closure flap 108 and adhesive layer 110 so that the insulated pipe and/or insulating material are not subjected to one or more environmental elements, such as water vapor. If the closure flap 108 is not able to seal or remain sealed (e.g., the closure flap 108 curls backward after being adhered to the laminate's outer surface), then water vapor and/or other contaminants may flow between the closure flap 108 and longitudinal edge portion 116 and thereby leak or pass into the interior of the pipe insulation product (i.e., pass to the encased pipe and insulating material). Water vapor and/or other contaminants that pass into the laminate's interior may cause condensation of water on the pipes; pipe corrosion or degradation; mold, mildew, and/or fungal growth; water drip damage; staining of the laminate and/or surrounding objects; loss of the pipe insulation product's insulating value; etc.

The laminate 102 may include one or more flame retardants, fungi growth inhibiting agents, charge dissipators, and/or other additives to enhance the performance of the laminate. Additionally, butt strips (not shown) may be used to connect individual segments of the pipe insulation product end to end. The butt strips may be strips of adhesive material (i.e., tape) that are substantially impermeable to fluid vapors to greatly restrict or eliminate the transmission of water vapor through the butt strips (i.e., the butt strips seal end segments of the pipe insulation product 100 together). The butt strip's ability to seal the end segments may also be compromised due to the closure flap's tendency to peel back or unseal.

Figure 2:
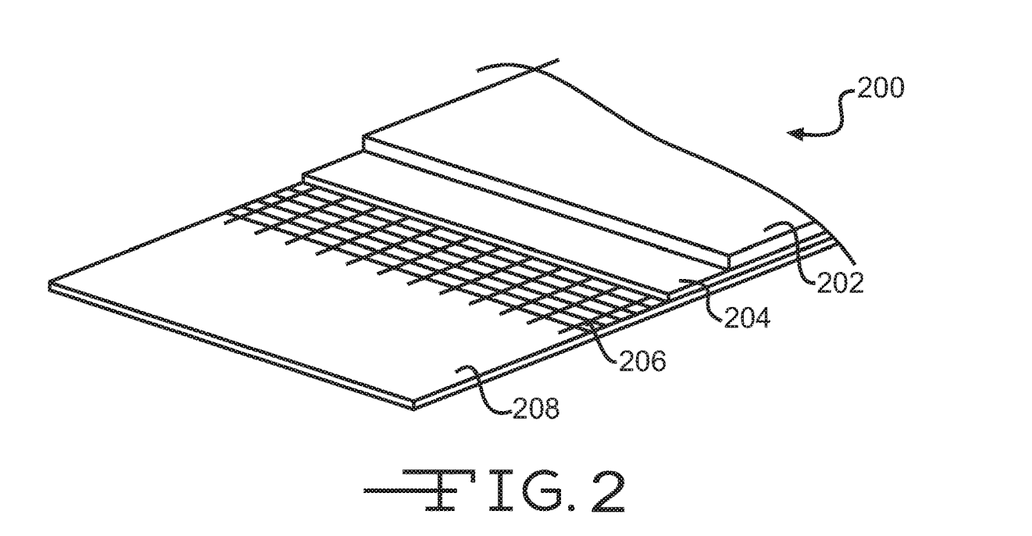
FIG. 2 is a schematic perspective view of a laminate jacket according to one embodiment of the present invention with portions of the laminate broken away to show the various layers of the laminate.

FIG. 2 depicts a laminate jacket 200 according to one embodiment of the present invention. FIG. 2 shows portions of the laminate 200 broken away to reveal the various layers of the laminate. The laminate 200 may include an inner layer composed of a foil or metallized polymeric film sheet 208. Preferably, the laminate 200 includes an inner layer that is made of aluminum foil or metallized polyethylene terphthalate (MPET) between about 0.48 mils and about 100 mils in thickness (between about 48 and 100 gauge in thickness). The inner layer aluminum foil or MPET provides a nearly impermeable fluid vapor barrier to fluids that are external to and surrounding the pipe insulation product. For example, the foil or metallized polymeric film sheet 208 is nearly impermeable to water vapor, which protects the insulated pipe from water condensation, corrosion, loss of insulating value, mold growth, etc. The foil or metallized polymeric film sheet 208 enables the laminate 200 to provide a water vapor transmission rate of less than 0.02 perms.

By using the foil or metallized polymeric film sheet 208, fluid may be passed through the insulated pipe and one or more environmental elements (e.g., water vapor) in the surrounding environment may be restricted (or kept) from penetrating through laminate to the pipe. When cold fluid is passed through the pipe, the foil or metallized polymeric film sheet 208 prevents water vapor from condensing on the pipes and causing the associated problems described herein. If the closure flap 108 becomes unsealed, however, the water vapor barrier is circumvented as water vapor may freely flow between the unsealed portion of the laminate. Although the foil or metallized polymeric sheet 208 is described as the inner layer of the laminate 200, the foil or metallized polymeric sheet 208 may be positioned anywhere within the laminate (e.g., immediately adjacent the polymeric sheet outer layer).

The laminate 200 may also include a scrim 206 the includes a mesh of a plurality of fibers. The scrim 206 may function to reinforce and strengthen the laminate 200 and thereby provide increased tensile strength, puncture resistance, etc. The scrim 206 may be made of fiberglass reinforcing yarn, such as but not limited to a G75 or H110 yarn. In addition, the yarn may be configured to be from 2 to 6 strands per inch in both the machine and cross machine directions, with a typical scrim being about 5 strands per inch in both directions. In some embodiments the scrim 206 may be made of polyester strings or any other synthetic string. The scrim 206 may be positioned immediately adjacent to the foil or metallized polymeric sheet 208 or may positioned anywhere else within the laminate (i.e., may be positioned immediately adjacent the polymeric sheet outer layer 202).

The laminate 200 may also include a porous media sheet 204. The porous media sheet 204 may be positioned immediately adjacent to the scrim 204 or may be positioned anywhere else within the laminate 200. The porous media sheet 204 may be a kraft paper that is between about 25 and 45 pounds/3000 square feet and may include one or more additives to enhance the performance of the laminate 200 (e.g., fire retardant additives and/or anti-microbial agents to prevent mold or fungal growth and prevent propagation of smoke and/or fire). In one embodiment, the porous media sheet 204 may be a kraft paper between 25 and 35 pounds/3000 square feet to provide increased seal integrity and/or closure of the closure flap 108 without significantly degrading beneficial properties of the laminate (e.g., tensile strength, puncture resistance, handling damage resistance, etc.). In one specific embodiment, the kraft paper may be roughly 30 pounds/3000 square feet to provide optimal levels of closure flap seal integrity and laminate properties.

Alternatively, the porous media sheet 204 may be other materials such as a fiberglass mat, synthetic mat, paper, etc. Likewise, in some embodiments the scrim 206 and porous media sheet 204 may be replaced by a single, preferably porous, material. The porous nature of the porous media sheet 204 may allow absorption and retention of one or more additives within the porous media sheet layer, which may provide one or more enhancements to the laminate 200 (e.g., flame and smoke propagation resistance; mold, mildew, and/or fungal growth resistance; etc.).

In laminates that employ a kraft paper, the use of a heavy weight kraft paper (e.g., 40-45 pounds/3000 square feet) may be preferred because such papers provide several advantages over lighter weight papers (e.g., 25-35 pounds/3000 square feet). For example, heavier weight kraft papers may provide structural advantages including increased durability, support, tensile strength, puncture resistance, handling damage resistance, environmental damage resistance, shipping damage resistance, etc. and/or may provide aesthetic advantages including a smoother, visually appealing, and more abuse resistant the outer surface. Heavy weight kraft papers, however, may increase that stiffness and rigidity of the laminate, which may increase a laminate's closure flap seal failure due to the laminate's resistance to bending or curling towards the closed position and remaining in the closed position (i.e., stiff and rigid laminates may be biased toward a flat or unsealed position).

The use of a lighter weight kraft paper (e.g., 25-35 pounds/3000 square feet) may increase a laminate's closure flap seal integrity by decreasing the laminate's resistance to bending or curling toward the closed position. In addition, the lighter weight kraft paper may not significantly degrade the beneficial properties of the laminate so that the laminate's functionality is not comprised. A paper weight that is roughly 30 pounds/3000 square feet may provide an optimal level of seal integrity vs. laminate properties. A further description of the advantages of using a kraft paper between the range of 25 and 35 pounds/3000 square feet is provided in U.S. Pat. No. 8,141,594 by Shumate et al., entitled "Pipe Insulation Products and Methods," the entire disclosure of which is incorporated herein.

The present invention, however, is not limited to the use of a lighter weight kraft paper (or to the use of a kraft paper in general). The present invention provides increased closure flap seal integrity regardless of if a heavy weight kraft paper, a light weight kraft paper, or some other porous media layer is used.

The laminate 200 additionally includes a polymeric film sheet outer layer 202. The polymeric film sheet 202 may be made of polypropylene, polyethylene, polyvinyl chloride, vinyl, saran, polyethylene terephthalate, thermoplastic polyolefin, etc. The polymeric film material may be selected as the laminate's outer layer 200 to provide one or more of the following advantages: shielding the porous media sheet 204 and/or insulating material from water vapor absorption; protecting against UV damage; protecting against mold, mildew, or fungal growth; providing a smooth, unwrinkled, visually appealing outer surface; etc. Polymeric film materials generally provide a smoother, more visually appealing outer surface when compared with traditional laminates.

However, the use of a polymeric film sheet outer layer 202 may result in an increased tendency of the closure flap to curl away from the closed sealed position, or in other words to reverse curl as described previously. The reverse curl may cause and/or enhance closure flap seal failure due to providing a lifting force against the adhesive material. Seal failure may be further enhanced depending on the climate and conditions the laminate 200 is subject to and/or may be enhanced because the polymeric film sheet provides a smoother lower energy surface for the adhesive material to bond with.

The reverse curl of the closure flap may be caused and/or enhanced by the inclusion of the polymeric film sheet 202. For example, in some embodiments the tension in the polymeric film sheet 202 (i.e., internal stress) may be greater than the tension in one or more layers within the laminate 200 (e.g., the porous media layer 204, the scrim 206, and/or the foil or metallized polymeric film sheet 208). The greater tension or internal stress in the polymeric film sheet 202 may cause the laminate to curl so that the edges of the laminate bend toward the polymeric film sheet 202. The increased tension in the polymeric film sheet 202 may be due to the process of manufacturing the laminate (e.g., the polymeric sheet may be tensioned more than the other layers during manufacturing), to shrinkage of the polymeric film sheet 202 after manufacturing (e.g., heat shrinkage), to cold working the polymeric film sheet 202 and/or laminate 200, to shape memory within the laminate, or may be due to some other process. In some embodiments, the tension may not be greater in the polymeric film sheet 202 and the reverse curl may be due to other factors (e.g., creasing of the laminate, the shipping configuration of the laminate and cold working or shape memory (see description of FIG. 5), etc.).

The foil or metallized polymeric film sheet 208, the scrim 206, the porous media sheet 204, and the polymeric film sheet 202 may be bonded or adhered together using one or more adhesives (not shown). The adhesive or adhesives used may be contact type, pressure sensitive, heat seal, etc. and may include one or more additives to enhance the performance, dimensional stability, moisture resistance, handleability, fire and smoke propagation resistance, and/or durability of the laminate 200. Examples of adhesives that can be used include, but are not limited to, melamine, urea formaldehyde, phenolic, polyurethane, acrylic, latex, and acrylonitrile. Additional adhesives that can be used include adhesives that can migrate into the porous media sheet 204 to improve the physical characteristics of the laminate 200 (e.g., improve UV stability, flame spread resistance, mold growth resistance, etc.). Examples of such migrating adhesives are colloidal silica or alumina, sodium or potassium silicate, ammonium phosphate stabilized with zinc oxide, magnesia or alumina; borax, and oxi-chloride stabilized with zinc oxide or magnesia.

Figure 3:
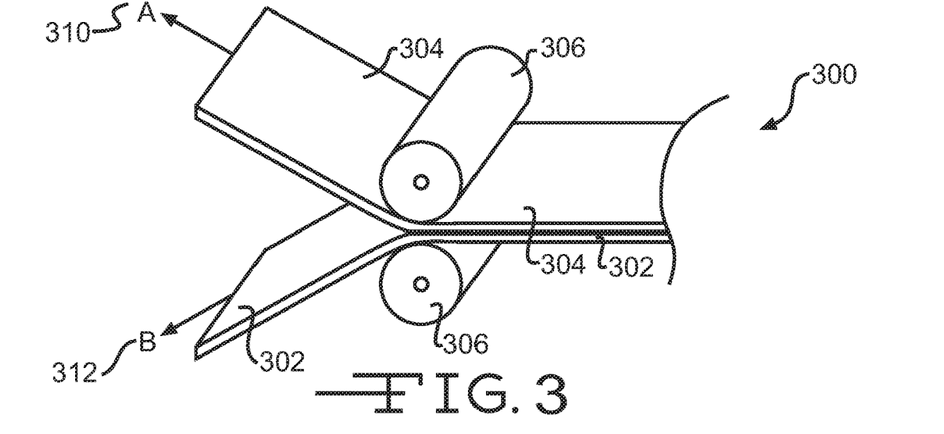
FIG. 3 is a schematic perspective view of a process for manufacturing a laminate.

FIG. 3 depicts a process 300 of manufacturing a laminate according to one embodiment of the present invention. The process 300 may be used to induce an inward curling closure flap (i.e., produce a positive curl) or, alternatively, reduce the amount of reverse curl that a closure flap experiences due to manufacturing. The process 300 may include a plurality of rollers 306 that may compress a plurality of layers 302 and 304 (e.g., the foil or metallized polymeric sheet, scrim, porous media sheet, and polymeric film sheet) to form a single multilayered laminate. The figures illustrate two layers being compressed together, but the system could include other layers. In some embodiments, layer 302 includes the polymeric film sheet outer layer and layer 304 includes the foil or metallized polymeric sheet, the scrim, and the porous media sheet.

During lamination, tension may be applied to each of the layers 302 and 304 (shown by element 312 (tension A) and 310 (tension B), respectively). The layers may be kept in tension during lamination to prevent wrinkles and/or to facilitate winding of the finished laminate. The tension applied to each of the laminates, however, may not be uniform. For example, in some embodiments, tension A, 310, that is applied to the polymeric film sheet layer 304 may be greater than tension B, 312, that is applied to the other layers 302 of the laminate. The increased tension applied the polymeric film sheet layer 304 may result in greater internal stress within the polymeric film sheet outer layer 304 of the laminate, which may cause the laminate to curl toward the polymeric film sheet and thereby cause the reverse curl of the closure flap. In other embodiments, tension A, 310, may be roughly equivalent to tension B, 312, but shrinkage (e.g., heat shrinkage) after lamination may cause the internal stress within the polymeric film sheet outer layer 304 to be greater than one or more of the other layers 302. The greater internal stress may result in the reverse curl of the closure flap.

According to one embodiment of the invention, the tensions, 310 and 312, applied to the layers, 304 and 302, may be controlled to increase the post lamination tension or internal stress in the other layers 302 of the laminate and/or to account for any post lamination shrinkage that may occur in the polymeric film sheet layer 304 (i.e., tension A, 310, may be decreased, tension B, 312, may be increased, etc.). As the tension or internal stress in the other layers 302 of the laminate are increased relative to the polymeric film sheet layer 304, the reverse curl may be reduced and/or a positive curl may be induced so that the closure flap curls toward the closed sealed position (i.e., the tension or internal stress within the other layers 302 will cause the laminate to curl toward the inner layer of the laminate).

Figure 4:
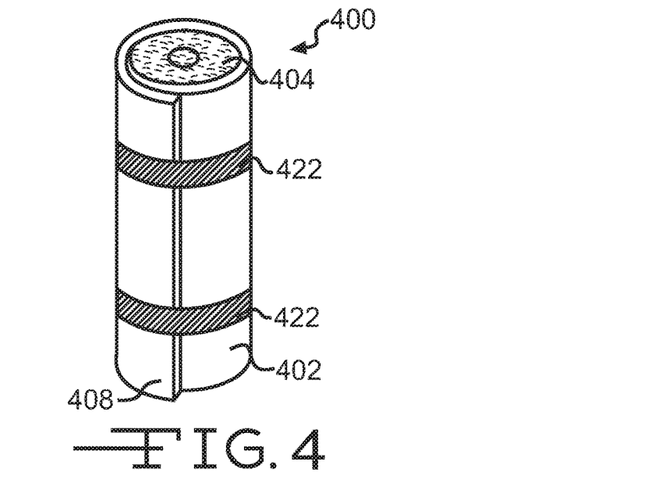
FIG. 4 is a schematic perspective view illustrating a process for inducing an inward curling closure flap.

FIG. 4 depicts another process 400 for reducing a closure flap's reverse curl and/or inducing a positive inward curl. The process 400 may include a laminate 402 surrounding and bonded to a tubular core of insulating material 404 as previously described. The laminate 402 may include a polymeric film material outer layer having a closure flap 408 with a reverse curl. The reverse curl may be reduced and/or a positive curl induced by positioning the closure flap 408 in the closed position, securing the closure flap 408 in the closed position, heat treating the laminate to soften the polymeric sheet material (i.e., relaxing the polymers to reduce or eliminate the internal stress or tension), and cooling the polymeric film sheet so that the polymeric sheet material hardens or sets and recrystallizes or reforms with a reduced reverse curl or with a positive curl (i.e., the polymeric sheet material hardens with the closure flap curling toward the closed position).

FIG. 4 illustrates the closure flap 408 being secured in the closed position through the use of a plurality of straps 422, but any securing device, mechanism, or method may be used to secure the closure flap 408 in the closed position. For example, the securing device may include one or more adhesives, weights, clamps, molds, clips, bands, jackets, etc. Further, the laminate may be heated and/or cooled using a variety of process such as ovens (radiation, microwave, etc.), blowers, heating elements, fans, etc. The laminate 402 may be kept in the secured position until prior to installation to further configure the closure flap with the positive curl (i.e., induce shape memory).

Figure 5:
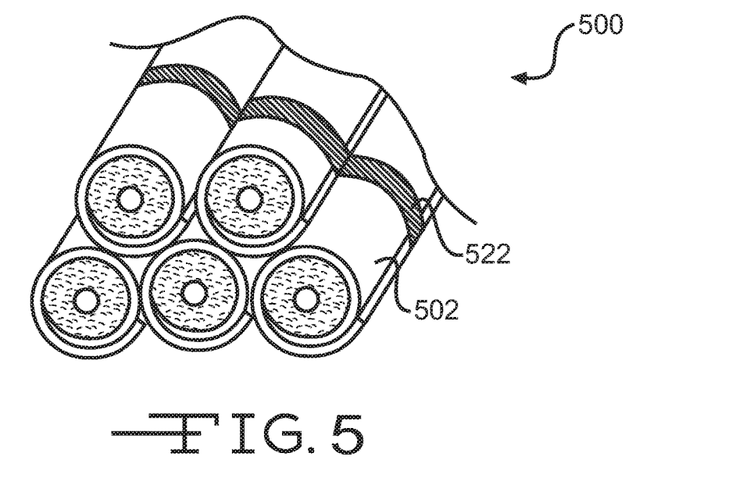
FIG. 5 is a schematic perspective view illustrating another process for inducing an inward curling closure flap.

FIG. 5 depicts another process 500 for reducing a closure flap's reverse curl and/or inducing a positive inward curl. The figure illustrates a plurality of laminates 502 stacked atop one another. Each laminate 502 of the plurality of laminates may include a securing device or mechanism, such as a strap 522, to secure the laminate's closure flap 508 in a closed position. In some embodiments, the laminates 502 do not include a securing device, but are arranged so that the closure flap is positioned in the closed position as the laminates are stacked atop one another. The arrangement of the laminates may secure the closure flap in the closed position (i.e., the adjacent laminates may secure the closure flap). The plurality of laminates may then be heat treated to reduce a reverse curl or induce a positive curl as previously described and/or the laminates may be maintained or held in the arranged position for a duration of time so that a reverse curl is reduced or a positive curl is induced (i.e., a positive curl shape memory is induced, the polymeric film material experiences cold working, etc.). In some embodiments, the plurality of laminates are arranged with the closure flap in the closed position, and/or secured in the closed position, and shipped so that the reverse curl is reduced or the positive curl is induced during shipping.

Figure 6:
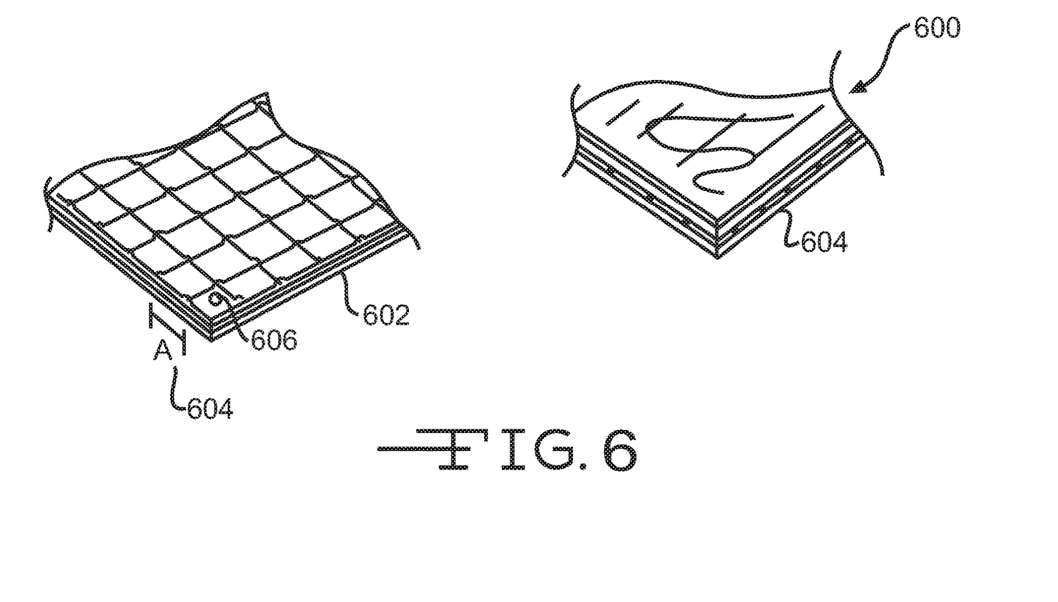
FIG. 6 is a schematic perspective view illustrating laminates of the present invention having different layer configurations.

FIG. 6 illustrates two different laminate configurations 600. The figure shows the surface of the foil or metallized polymeric film sheet inner layer of both laminates, 602 and 610. Laminate 602 illustrates a common laminate configuration with the foil or metallized polymeric film sheet directly adjacent to the scrim layer (shown by the fiber mesh). The scrim mesh may include a plurality of fibers having a defined spacing A, 604, and a defined fiber orientation θ, 606. The foil or metallized polymeric sheet layer is generally a thin pliable layer of material. As such, the scrim fiber mesh often produces contours 608 in the foil or metallized polymeric sheet layer as the foil or metallized polymeric film sheet conforms to the individual fiber strands directly underneath the foil or metallized polymeric film sheet. The contours may produce areas where the foil or metallized polymeric material is more prone to damage such as scrapping, scuffing, tearing, ripping, etc.

In addition, the contours may produce stress concentration points within the foil or metallized polymeric sheet, which may increase the likelihood of tearing, ripping, etc. Likewise, the contours may limit the amount of stress that may be applied to the foil or metallized polymeric sheet layer due to tearing and/or ripping concerns. The contours may cause one or more defects (e.g., tearing, scuffing, etc.) to occur to the foil or metallized polymeric sheet during manufacturing and/or use of the laminate. According to one embodiment of the present invention, the scrim fiber mesh may be placed away from the foil or metallized polymeric sheet so that at least one layer of material (e.g., the porous media layer) is between the scrim and the foil or metallized polymeric sheet as illustrated by laminate 610. The layer between the scrim and the foil or metallized polymeric sheet may act as a buffer between the layers so that the contours in the foil or metallized polymeric sheet are reduced or eliminated (illustrated by the smooth foil or metallized polymeric sheet surface in laminate 610).

Because the contours may be removed, the foil or metallized polymeric sheet may be less prone to scrapping, scuffing, tearing, ripping, etc. and/or the stress concentration points may be removed. This may allow the foil or metallized polymeric sheet to be placed under greater tension without ripping or tearing the foil or metallized polymeric sheet. The layer directly adjacent the foil or metallized polymeric sheet (e.g., the porous media layer) may further add structural support to the foil or metallized polymeric sheet. The increased tensioning of the foil or metallized polymeric sheet and/or the added structural support may allow the reverse curl to be reduce or a positive curl to be induced through controlled tensioning described in relation to FIG. 3. The removal or the contours and/or the added structural support may also minimize the defects that occur during manufacturing and or use. The removal of defects in the foil or metallized polymeric sheet may increase the perm rating of the laminate (i.e., may provide a more impermeable layer to water vapor and/or other contaminants).

In addition, the scrim may be placed directly adjacent to the polymeric film sheet outer layer, which may add structural support and/or stability to the polymeric film sheet outer layer. The added structural support and/or stability may limit the heat shrinkage of the polymeric film sheet outer layer and/or allow for greater control over the tensioning of the polymeric film sheet layer. The added structural support and/or stability of the polymeric film sheet may reduce the amount of reverse curl that the closure flap experiences.

Figure 7:
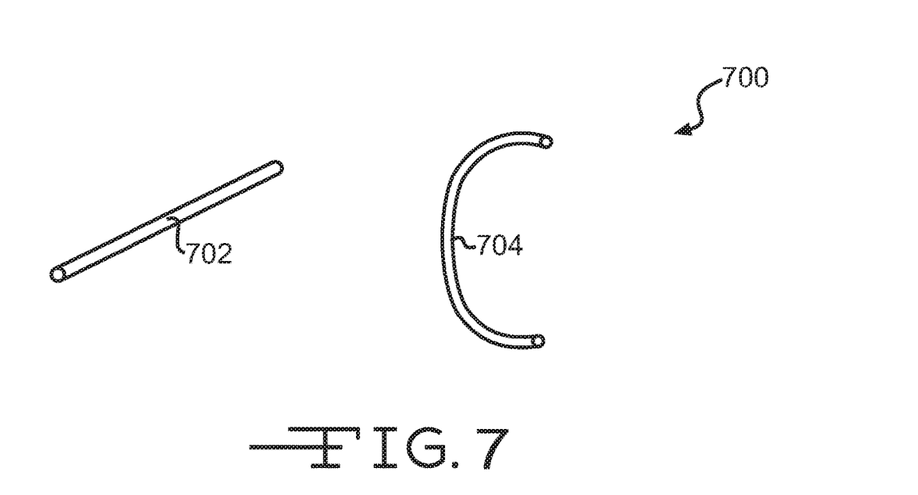
FIG. 7 is a schematic perspective view of various scrim fibers that may be used to induce an inward curling closure flap.

FIG. 7 illustrates various scrim fibers 700 that may be used to reduce a reverse curl or induce a positive curl. Fiber 702 may be a straight fiber having a defined diameter 706. The fiber 702 may be biased toward the straight position, which may impede closure and sealing of the laminate's closure flap due to a force produced by the fiber 702 as the fiber 702 is forced to bend away from the straight position. As the diameter 706 of the fiber 702 is increased, the force produced when the fiber is bent from the straight position may also increase. The fiber mesh of the scrim may be designed to have a specific configuration and fiber spacing (see spacing A and orientation θ of FIG. 6) based on the diameter 706 of the fibers 702 used in the scrim. Closure and/or sealing of the closure flap may be facilitated by reducing the diameter 706 of the fibers 702 used and adjusting the fiber configuration and spacing accordingly. The decreased diameter 706 of the fibers 702 may reduce the force produced when the fibers 702 are bent from the straight position (i.e., smaller and more tightly spaced fibers may reduce a force produced by the scrim to flatten out the laminate).

Similarly, the use of lighter weight fibers, more flexible fibers, and/or fiber pattern geometry (i.e., the spacing and/or orientation of the fibers—see A and θ of FIG. 6) may further reduce a force produced when the fibers 702 are bent from the straight position. Additionally, fibers could be used that produce a positive curling force in the polymeric film sheet. Fiber 704 illustrates a fiber that may produce a positive curling force. The positive curl may be induced in the fiber 704 when the fiber is stretched, heated, exposed to a chemical, etc. Similarly, the fiber 704 may be included in the scrim and laminate so that after inclusion in the laminate, the fiber scrim mesh provides a positive curling force on the laminate.

As previously described, the polymeric film sheet outer layer may shrink during and/or after manufacturing of the laminate. The shrinkage may be due to the exposure of the polymeric film sheet to heat. The heat may be provided by the adhesive used to bond the layers of the laminate and/or used to bond the laminate with the insulating material (e.g., hot melt adhesive) and/or may be provided by residual heat present in the insulating material when the laminate is bonded to the insulating material (the insulating material may have residual heat due to one or more manufacturing processes). The heat from the adhesive and/or the residual heat present in the insulating material may conduct through the inner layers of the laminate to the polymeric film sheet outer layer. Upon exposure to the heat, the polymeric film material may shrink, which may cause internal stress or tension that results in reverse curling of the closure flap.

To reduce the amount of reverse curl in the closure flap, the polymeric film sheet's exposure to heat may be minimized by strictly controlling the temperature of the adhesive so that the adhesive is not applied in excess of the temperature needed and/or by exposing the insulating material to one or more cooling processes (i.e., the insulating material may be brought to near ambient temperature). Minimizing the polymeric film sheet's exposure to heat may minimize the polymeric film material's heat shrinkage, which may reduce the closure flap's reverse curl.

Figure 8:
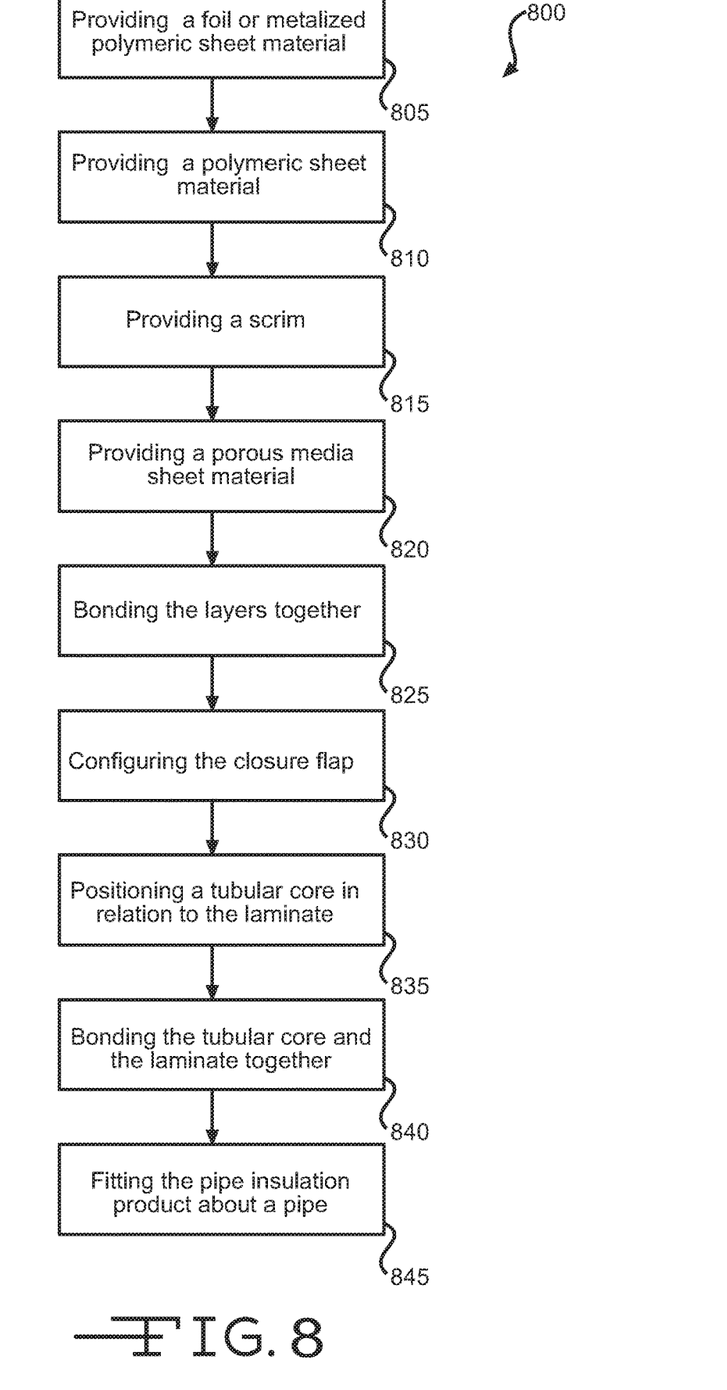
FIG. 8 is a flow diagram illustrating a method for manufacturing a pipe insulation product.

FIG. 8 illustrates a flow diagram 800 of a method for manufacturing a pipe insulation product according to one embodiment of the present invention. At block 805, a foil or metallized polymeric sheet may be provided. The foil or metallized polymeric sheet may form an inner layer of the laminate and may provide a fluid vapor barrier to minimize fluid vapor transmission through the laminate. At block 810, a polymeric sheet material may be provided. The polymeric sheet material may form an outer exposed layer of the laminate and may include a closure flap that is configured to adhesively seal opposite sides of the laminate jacket so that the laminate forms a hollow cylindrical tube. The closure flap may curl toward the closed position (or may be configure to curl more toward the closed position) to provide a greater closure flap adhesive seal bond.

At block 815, a scrim may be provided. The scrim may include a mesh of a plurality of fibers and may be positioned between the foil or metallized polymeric sheet and the polymeric sheet outer layer. At block 820, a porous media sheet material may be provided. At block 825, the foil or metallized polymeric sheet material, the scrim, the porous media sheet material, and the polymeric sheet material may be bonded together via an adhesive material to form the laminate jacket. At block 830, the closure flap may be configured so that the closure flap includes a curl that provides a greater closure flap adhesive seal bond.

At block 835 a tubular core of insulating material may be positioned relative to the laminate so that the tubular core can be wrapped or encased within the laminated. At block 840, the laminate and tubular core may be bonded together to form the pipe insulation product. The pipe insulation product may be flexible so that the tubular core and laminate can be opened, placed about a pipe, and closed without degrading the laminate jacket. At block 845, the pipe insulation product may be fitted about a pipe to insulate and/or protect the pipe as described previously.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The invention claimed is:

1. A method of manufacturing a laminate, the method comprising:
providing an inner layer comprising a foil or metallized polymeric sheet material, the inner layer comprising:
a length,
a width,
a first face, and
a second face, wherein the length and width form an area that define the first face and the second face;
positioning an outer layer such that the outer layer is coextensive with the second face, wherein the outer layer comprises a polymeric sheet material, and wherein the outer layer comprises a closure flap;
positioning an intermediate layer between the inner layer and the outer layer, wherein the intermediate layer provides reinforcement for the laminate;
compressing the inner layer, the intermediate layer, and the outer layer together using a plurality of rollers to form a single multilayered laminate;
applying a first tension to the inner layer and the intermediate layer as the inner layer and the intermediate layer enter an opposing pair of the plurality of rollers and applying a second tension to the outer layer that is less than the first tension as the outer layer enters the opposing pair of the plurality of rollers; and
maintaining the first tension and the second tension during lamination of the inner layer, the intermediate layer, and the outer layer.

2. The method of manufacturing a laminate of claim 1, further comprising:
reducing a convex configuration of the closure flap, or
configuring the closure flap to include a concave configuration.

3. The method of manufacturing a laminate of claim 1, further comprising:
heat treating the laminate to relax polymers of the polymeric sheet material and thereby reduce internal stresses; and
cooling the polymeric sheet material so that the polymers recrystallize with the closure flap curled radially inward.

4. The method of manufacturing a laminate of claim 1, further comprising:
securing the closure flap in a closed position;
heat treating the laminate to soften the polymeric sheet material; and
cooling the polymeric sheet material so that the polymeric sheet material hardens with the closure flap curled toward the closed position.

5. The method of manufacturing a laminate of claim 1, further comprising:
positioning at least one strap circumferentially around the laminate and a tubular core prior to heat treating the laminate, wherein the at least one strap secures the closure flap in the closed position.

6. The method of manufacturing a laminate of claim 1, further comprising:
applying a pressure sensitive adhesive to the closure flap.

7. The method of manufacturing a laminate of claim 1, further comprising:
positioning a tubular core directly adjacent the first face of the inner layer, wherein the tubular core comprises:
a length and a longitudinal axis;
a substantially cylindrical outer surface, the substantially cylindrical outer surface comprising a surface area that is roughly equivalent to the area of the first face;
a substantially cylindrical inner surface; and
a wall extending between the cylindrical outer surface and the cylindrical inner surface; the wall comprising:
a radially extending thickness; and
a slit extending from the cylindrical outer surface to the cylindrical inner surface and extending parallel to the longitudinal axis of the tubular core for the length of the tubular core; and
bonding, via an adhesive material, the tubular core with the first face of the inner layer, wherein the laminate and tubular core are flexible so as to be opened, placed about a pipe, and closed without degrading the laminate.

8. The method of manufacturing a laminate of claim 1, further comprising:
applying at least one adhesive between one or more of the inner layer, the intermediate layer, and the outer layer.

9. The method of manufacturing a laminate of claim 8, wherein:
the at least one adhesive comprises a hot melt adhesive.

10. The method of producing a laminate as in claim 1, further comprising:
applying one or more additives to the laminate, the one or more additives comprising one or more of a flame retardant, a fungi growth inhibiting agent, and a charge dissipater.

11. The method of manufacturing a laminate of claim 1, wherein:
the foil or metallized polymeric sheet material comprises aluminum foil or metallized polyethylene terephthalate (MPET).

12. The method of manufacturing a laminate of claim 1, wherein:
the intermediate layer comprises a scrim.

13. The method of manufacturing a laminate of claim 1, further comprising:
positioning an additional intermediate layer between the inner layer and the outer layer, wherein the intermediate layer comprises a scrim and the additional intermediate layer comprises a porous media sheet material.

14. The method of manufacturing a laminate of claim 1, wherein:
applying the first tension and the second tension causes the closure flap to curl toward a closed position.

15. A method of manufacturing a laminate, the method comprising:
providing an inner layer comprising a foil or metallized polymeric sheet material, the inner layer comprising:
a length,
a width,
a first face, and
a second face, wherein the length and width form an area that define the first face and the second face;

positioning an outer layer such that the outer layer is coextensive with the second face, wherein the outer layer comprises a polymeric sheet material, and wherein the outer layer comprises a closure flap;

positioning an intermediate layer between the inner layer and the outer layer, wherein the intermediate layer provides reinforcement for the laminate;

compressing the inner layer, the intermediate layer, and the outer layer together using a plurality of rollers to form a single multilayered laminate; and applying a first tension to the inner layer and the intermediate layer as the inner layer and the intermediate layer enter an opposing pair of the plurality of rollers and applying a second tension to the outer layer as the outer layer enters the opposing pair of the plurality of rollers, wherein the first tension is greater than the second tension, thereby causing the closure flap to curl toward a closed position.

16. The method of manufacturing a laminate of claim 15, further comprising:

heat treating the laminate to relax polymers of the polymeric sheet material and thereby reduce internal stresses; and cooling the polymeric sheet material so that the polymers recrystallize with the closure flap curled radially inward.

17. The method of manufacturing a laminate of claim 15, further comprising:

securing the closure flap in a closed position;

heat treating the laminate to soften the polymeric sheet material; and cooling the polymeric sheet material so that the polymeric sheet material hardens with the closure flap curled toward the closed position.

18. The method of manufacturing a laminate of claim 15, further comprising:

positioning at least one strap circumferentially around the laminate and a tubular core prior to heat treating the laminate, wherein the at least one strap secures the closure flap in the closed position.

19. The method of manufacturing a laminate of claim 15, further comprising:

applying a pressure sensitive adhesive to the closure flap.

20. The method of manufacturing a laminate of claim 15, further comprising:

positioning a tubular core directly adjacent the first face of the inner layer, wherein the tubular core comprises:

a length and a longitudinal axis;

a substantially cylindrical outer surface, the substantially cylindrical outer surface comprising a surface area that is roughly equivalent to the area of the first face;

a substantially cylindrical inner surface; and a wall extending between the cylindrical outer surface and the cylindrical inner surface; the wall comprising:

a radially extending thickness; and a slit extending from the cylindrical outer surface to the cylindrical inner surface and extending parallel to the longitudinal axis of the tubular core for the length of the tubular core; and bonding, via an adhesive material, the tubular core with the first face of the inner layer, wherein the laminate and tubular core are flexible so as to be opened, placed about a pipe, and closed without degrading the laminate.

21. The method of manufacturing a laminate of claim 15, further comprising:

applying at least one adhesive between one or more of the inner layer, the intermediate layer, and the outer layer.

22. The method of producing a laminate of claim 15, further comprising:

applying one or more additives to the laminate, the one or more additives comprising one or more of a flame retardant, a fungi growth inhibiting agent, and a charge dissipater.

23. The method of manufacturing a laminate of claim 15, wherein:

the foil or metallized polymeric sheet material comprises aluminum foil or metallized polyethylene terephthalate (MPET).

24. The method of manufacturing a laminate of claim 15, wherein:

the intermediate layer comprises a scrim.

25. The method of manufacturing a laminate of claim 15, further comprising:

positioning an additional intermediate layer between the inner layer and the outer layer, wherein the intermediate layer comprises a scrim and the additional intermediate layer comprises a porous media sheet material.

* * * * *